US012551794B2

(12) United States Patent
Sui et al.

(10) Patent No.: US 12,551,794 B2
(45) Date of Patent: Feb. 17, 2026

(54) VIRTUAL ITEM SELECTION INTERFACE

(71) Applicant: Tencent Technology (Shenzhen) Company Limited, Guangdong (CN)

(72) Inventors: Jiajing Sui, Shenzhen (CN); Yue Wu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 527 days.

(21) Appl. No.: 17/987,319

(22) Filed: Nov. 15, 2022

(65) Prior Publication Data
US 2023/0076343 A1 Mar. 9, 2023

Related U.S. Application Data

(63) Continuation of application No. PCT/CN2022/090928, filed on May 5, 2022.

(30) Foreign Application Priority Data
May 26, 2021 (CN) ........................ 202110576112.1

(51) Int. Cl.
*A63F 13/537* (2014.01)
*A63F 13/2145* (2014.01)
(Continued)

(52) U.S. Cl.
CPC ........ *A63F 13/537* (2014.09); *A63F 13/2145* (2014.09); *A63F 13/42* (2014.09);
(Continued)

(58) Field of Classification Search
CPC .. A63F 13/537; A63F 13/2145; A63F 13/426; A63F 13/44; A63F 13/837; A63F 13/42; A63F 13/55
See application file for complete search history.

(56) References Cited

U.S. PATENT DOCUMENTS 9,369,657 B2 * 6/2016 Lee .................. H04N 21/4312
10,025,460 B1 * 7/2018 Almand ............... G06F 3/0482
(Continued)

FOREIGN PATENT DOCUMENTS

CN 107930120 A 4/2018
CN 111803933 A 10/2020
(Continued)

OTHER PUBLICATIONS

Communicate long-press functionality in a web UI. ux.stackexchange. com. Online. 2017-03-24. Accessed via the Internet. Accessed Mar. 13, 2025. <URL: https://ux.stackexchange.com/questions/106286/communicate-long-press-functionality-in-a-web-ui> (Year: 2017).*
(Continued)

*Primary Examiner* — Carl V Larsen
(74) *Attorney, Agent, or Firm* — ARENTFOX SCHIFF LLP

(57) ABSTRACT

A method for selecting a virtual item is provided. In the method, an item selection element is displayed. An item selection control interface is displayed based on a continuous touch operation that is initially performed on the item selection element. The item selection control interface includes at least one candidate virtual item. The selected virtual item is determined as one of the at least one candidate virtual item included the item selection control interface when an end point of the continuous touch operation corresponds to the one of the at least one candidate virtual item in the item selection control interface. Apparatus and non-transitory computer-readable storage medium counterpart embodiments are also contemplated.

20 Claims, 11 Drawing Sheets

(51) Int. Cl.
  *A63F 13/42* (2014.01)
  *A63F 13/426* (2014.01)
  *A63F 13/44* (2014.01)
  *A63F 13/55* (2014.01)
(52) U.S. Cl.
  CPC ............ *A63F 13/426* (2014.09); *A63F 13/44* (2014.09); *A63F 13/55* (2014.09)

(56) References Cited

U.S. PATENT DOCUMENTS

| | | | | |
|---|---|---|---|---|
| 2004/0095395 | A1* | 5/2004 | Kurtenbach | G06F 3/0482 715/810 |
| 2005/0223339 | A1* | 10/2005 | Lee | H04N 21/47 715/713 |
| 2010/0009733 | A1 | 1/2010 | Garvin et al. | |
| 2010/0281374 | A1* | 11/2010 | Schulz | H04M 1/72469 715/830 |
| 2010/0306702 | A1* | 12/2010 | Warner | G06F 3/0482 715/834 |
| 2011/0025649 | A1* | 2/2011 | Sheikhzadeh Nadjar | G06F 3/043 178/20.01 |
| 2011/0066980 | A1* | 3/2011 | Chmielewski | G06F 3/0482 715/834 |
| 2011/0093815 | A1* | 4/2011 | Gobeil | G06F 9/451 715/825 |
| 2013/0019173 | A1* | 1/2013 | Kotler | G06F 3/04883 715/834 |
| 2016/0019464 | A1* | 1/2016 | Madhavan | H04W 4/18 706/11 |
| 2016/0147433 | A1* | 5/2016 | Lin | G06F 11/3096 715/834 |
| 2016/0259496 | A1* | 9/2016 | Butcher | G06F 3/04842 |
| 2018/0043260 | A1* | 2/2018 | Tang | A63F 13/822 |
| 2019/0366213 | A1* | 12/2019 | Zhou | A63F 13/533 |
| 2021/0144429 | A1* | 5/2021 | Liu | H04N 21/42224 |
| 2021/0252387 | A1* | 8/2021 | Spofford | A63F 13/533 |

FOREIGN PATENT DOCUMENTS

| | | |
|---|---|---|
| CN | 112138391 A | 12/2020 |
| CN | 113398571 A | 9/2021 |

OTHER PUBLICATIONS

Darcblade. How to Customize the Item Bar and Radial Menu : Monster Hunter World. Youtube.com Online. Feb. 13, 2018. Accessed via the Internet. Accessed Mar. 13, 2025 .<URL: https://www.youtube.com/watch?v=7OIA3S2Aj4w> (Year: 2018).*

MostRush. Weapon selection wheel [Customizable, Quick switch, Gta V design]. Online. Jan. 20, 2020. Accessed via the Internet. Accessed Mar. 13, 2025. <URL: https://www.youtube.com/watch?v=IS0qNREs7i8&t=18s> (Year: 2020).*

Sofa Supastar Gaming. cyberpunk 2077 mod slots explained. Online. Feb. 9, 2021. Accessed via the Internet. Accessed Mar. 13, 2025. <URL: https://www.youtube.com/watch?v=NkWyTXgaDbA> (Year: 2021).*

Ordinary Sense. How To Use Clothing Mods On Your Clothes Or Armor Cyberpunk 2077—Equip Clothing Mods On Armor. Youtube.com. Online. 2020-12-11. Accessed via the Internet. Accessed Mar. 13, 2025. <URL: https://www.youtube.com/watch?v=xUA7Pp8q9pI> (Year: 2020).*

International Search Report and Written Opinion in PCT/CN2022/090928, mailed Jul. 11, 2022, 13 pages.

* cited by examiner

VIRTUAL ITEM SELECTION INTERFACE

RELATED APPLICATIONS

The present application is a continuation of International Application No. PCT/CN2022/090928 filed on May 5, 2022, which claims priority to Chinese Patent Application No. 202110576112.1, entitled "METHOD AND APPARATUS FOR SWITCHING VIRTUAL ITEM, TERMINAL AND STORAGE MEDIUM" and filed on May 26, 2021. The entire disclosures of the prior applications are hereby incorporated by reference in their entirety.

FIELD OF THE TECHNOLOGY

This application relates to the field of human-computer interaction technologies, including to a method and an apparatus for switching a virtual item, a terminal and a storage medium.

BACKGROUND OF THE DISCLOSURE

In an application based on a two-dimensional or a three-dimensional virtual environment, such as a multiplayer online battle arena game, a multiplayer online role-playing game and a first/third-person shooting game, and a user can control a virtual object to compete or entertain in a virtual environment.

In the related art, the user can control the virtual object to equip different virtual items for attacking other virtual objects or obtaining resources in the virtual environment. When the user changes the virtual item equipped by the virtual object, the user needs to open an item bar and click a target virtual item in the item bar to realize the switching of the virtual item. After the switching is completed, the item bar needs to be closed.

It can be seen that when the virtual item is switched in this way, the switching of the virtual item needs to be completed by clicking at different positions for a plurality of times, and the item switching process is relatively complex.

SUMMARY

Embodiments of this disclosure provide a method and an apparatus for selecting, or switching, a virtual item, a terminal, and a non-transitory computer-readable storage medium. The technical solutions include the following:

According to an aspect, an embodiment of this disclosure provides a method for selecting a virtual item. The method may be performed by a terminal for example. In the method, an item selection element is displayed. An item selection control interface is displayed based on a continuous touch operation that is initially performed on the item selection element. The item selection control interface includes at least one candidate virtual item. The selected virtual item is determined as one of the at least one candidate virtual item included the item selection control interface when an end point of the continuous touch operation corresponds to the one of the at least one candidate virtual item in the item selection control interface.

According to another aspect, an embodiment of this disclosure provides an apparatus for selecting a virtual item. The apparatus includes processing circuitry that is configured to display an item selection element, and display an item selection control interface based on a continuous touch operation that is initially performed on the item selection element. The item selection control interface includes at least one candidate virtual item. The processing circuitry is configured to determine the selected virtual item as one of the at least one candidate virtual item included the item selection control interface when an end point of the continuous touch operation corresponds to the one of the at least one candidate virtual item in the item selection control interface.

According to another aspect, an embodiment of this disclosure provides a terminal, including a processor and a memory; the memory storing at least one program, the at least one program being loaded and executed by the processor to implement the method for selecting, or switching, a virtual item.

According to another aspect, an embodiment of this disclosure provides a non-transitory computer-readable storage medium, storing instructions which when executed by a processor cause the processor to implement the method for selecting, or switching, a virtual item.

According to an aspect of this disclosure, a computer program product or a computer program is provided, including computer instructions, the computer instructions being stored in a computer-readable storage medium. A processor of a terminal reads the computer instructions from the computer-readable storage medium, and executes the computer instructions, to cause the terminal to implement the method for selecting, or switching, a virtual item.

Technical solutions provided in the embodiments of this disclosure may include at least the following beneficial effects:

In embodiments of this disclosure, when a user switches a virtual item currently equipped by a virtual object, an item selection control for displaying a candidate virtual item can be triggered by a long-press operation on the item switching control. In this case, after the user swipes to a target item selection control through a swipe operation, the virtual item can be switched to a target virtual item corresponding to the target item selection control. That is, switching of the virtual item can be realized through continuous long-press operation and swipe operation, without a need for a plurality of clicks in an interface, simplifying the operation of switching the virtual item, and improving the virtual item switching efficiency. In addition, compared with the related art, which requires a plurality of click operations in the interface to complete an item switching, the terminal needs to detect in real time whether there are click operations on positions of a plurality of specific controls. For example, a plurality of item switching controls, confirmation controls, interface off controls, and the like. However, in this disclosure, the item switching can be performed through a continuous long-press and swipe operation, and only a position after the swipe ends needs to be detected, which can reduce the touch detection power consumption of the terminal; and the item switching is performed through a special gesture operation of long-press and swipe operation, compared with the click operation, the probability of an accidental touch can be reduced.

DESCRIPTION OF EMBODIMENTS

Figure 1:
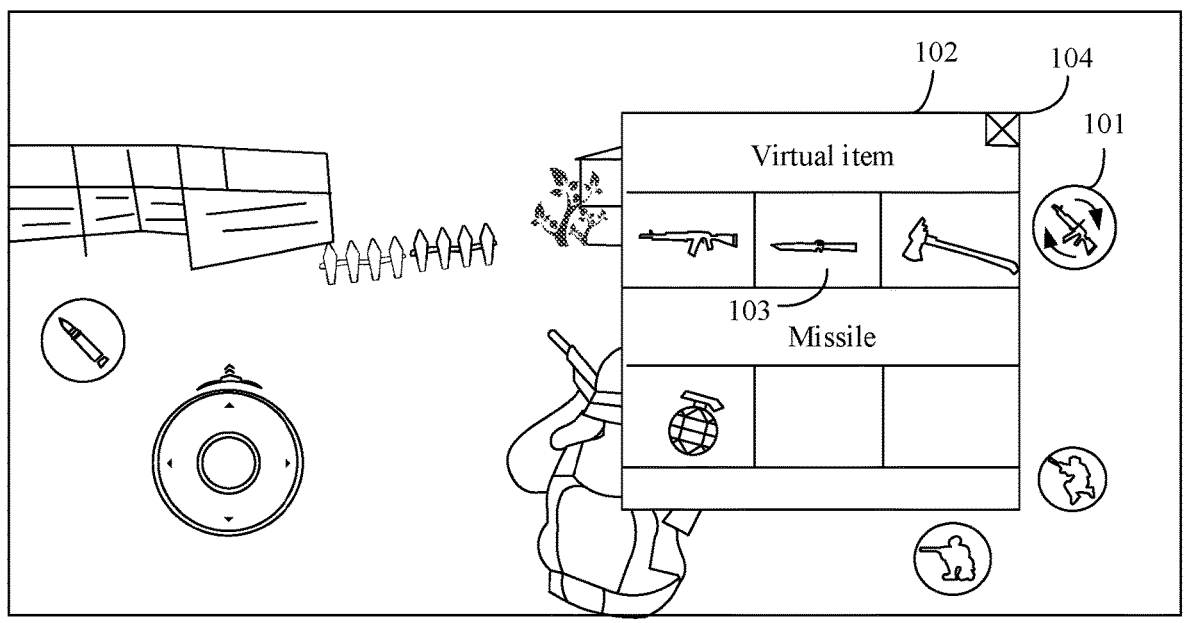
FIG. 1 is a schematic diagram of an interface of a virtual item switching process in the related art.

As shown in FIG. 1, in the related art, when switching a virtual item, an item switching control 101 needs to be clicked first, so that a terminal displays an item selection interface 102. To switch the virtual item currently equipped by a virtual object to a virtual item 103, a corresponding control needs to be clicked. After the switching is completed, the item selection interface 102 is closed through an interface off control 104. If the method for switching an item in the foregoing related art is adopted, a user needs to click at a plurality of different positions on a virtual environment interface to complete the switching of the virtual item. The switching process is relatively complex, and has a poor operation coherence, resulting in lower item switching efficiency. In addition, because the switching operation is a non-coherent operation, a current normal operation may be affected. For example, if a current user is using his left hand to control the movement of a virtual object, when switching a virtual item in this scene, since it needs to click at different positions to complete the switching, the user needs to hold the device steadily, and then completes the switching through a click operation, that is, the switching of the virtual item cannot be completed with one hand. Correspondingly, the left hand will not be able to control the movement of the virtual object. Therefore, the current normal operation may be interrupted during the item switching process, thereby affecting the game.

The virtual firearm, the virtual bullet, the dagger, the axe, the sickle, the grenade, the smoke grenade, etc. involved in the embodiments of this disclosure are all examples of virtual items in virtual games.

Figure 2:
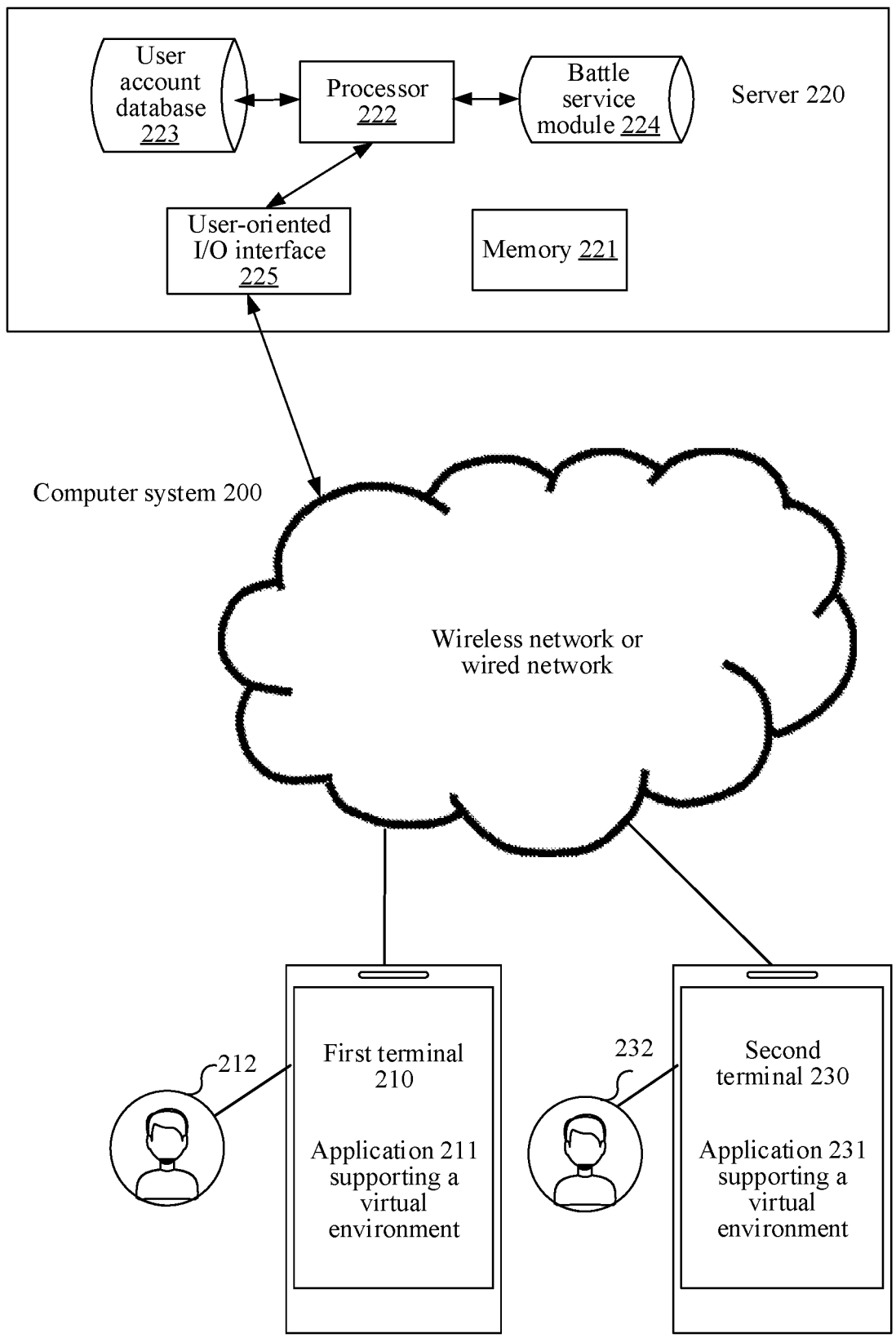
FIG. 2 is a schematic diagram of an implementation environment according to an exemplary embodiment of this disclosure.

FIG. 2 is a schematic diagram of an implementation environment according to an embodiment of this disclosure. The implementation environment may include: a first terminal 210, a server 220, and a second terminal 230.

An application program 211 supporting a virtual environment is run on the first terminal 210. When the first terminal runs the application program 211, a user interface of the application program 211 is displayed on a screen of the first terminal 210. The application program 211 may be any one of a multiplayer online battle arena (MOBA) game and a simulation game (SLG). An example in which the application program 211 is a massive multiplayer online role-playing game (MMORPG) is used for description. The first terminal 210 is a terminal used by a first user 212. The first user 212 uses the first terminal 210 to control a first virtual object located in the virtual environment to perform a movement, and the first virtual object may be referred to as a main control virtual object of the first user 212. The movement of the first virtual object includes, but is not limited to: at least one of adjusting body postures, crawling, walking, running, riding, flying, jumping, driving, picking, attacking, throwing, or skill casting. For example, the first virtual object is a first virtual character such as a simulated person or a cartoon person.

An application program 231 supporting a virtual environment is run on the second terminal 230. When the second terminal 230 runs the application program 231, a user interface of the application program 231 is displayed on a screen of the second terminal 230. The client may be any one of a MOBA game and an SLG game. An example in which the application program 231 is an MMORPG is used for description. The second terminal 230 is a terminal used by a second user 232. The second user 232 uses the second terminal 230 to control a second virtual object located in the virtual environment to perform a movement, and the second virtual object may be referred to as a master virtual character of the second user 232. For example, the second virtual object is a second virtual character, such as a simulated character or a cartoon character.

In an example, the first virtual object and the second virtual object are located in the same virtual world. The first virtual object and the second virtual object may belong to the same camp, the same team, or the same organization, have a friend relationship with each other, or have a temporary communication permission. The first virtual object and the second virtual object may belong to different camps, different teams, or different organizations, or have a hostile relationship with each other. An example in which the first virtual object and the second virtual object belong to the same camp is used for description.

In an example, the applications run on the first terminal 210 and the second terminal 230 are the same, or the applications run on the two terminals are the same type of applications in different operating system platforms (Android or iOS). The first terminal 210 may generally refer to one of a plurality of terminals, and the second terminal 230 may generally refer to another one of a plurality of terminals. Only the first terminal 210 and the second terminal 230 are used as an example for description. The device types of the first terminal 210 and the second terminal 230 are the same or different. The device types include: at least one of a smartphone, a tablet computer, an e-book reader, an MP3 player, an MP4 player, a laptop portable computer and a desktop computer.

FIG. 2 shows only two terminals. However, a plurality of other terminals may access the server 220 in different embodiments. In an example, one or more terminals are terminals corresponding to a developer. A developing and editing platform for the application program supporting a virtual environment is installed on the terminal. The developer may edit and update the application program on the terminal and transmit an updated application program installation package to the server 220 by using a wired or wireless network. The first terminal 210 and the second terminal 230 may download the application program installation package from the server 220 to update the application program.

The first terminal 210, the second terminal 230, and the another terminal are connected to the server 220 through a wireless network or a wired network.

The server 220 includes at least one of one server, a server cluster including a plurality of servers, a cloud computing platform, and a virtualization center. The server 220 is configured to provide a backend service for an application supporting a three-dimensional virtual environment. In an example, the server 220 is responsible for primary computing work, and the terminal is responsible for secondary computing work; or the server 220 is responsible for secondary computing work, and the terminal is responsible for primary computing work; or a distributed computing architecture is adopted between the server 220 and the terminal to perform collaborative computing.

In an example, the server 220 includes a memory 221, a processor 222, a user account database 223, a battle service module 224, and a user-oriented input/output (I/O) interface 225. The processor 222 is configured to load instructions stored in the server 220, and process data in the user account database 223 and the battle service module 224. The user account database 223 is configured to store data of user accounts used by the first terminal 210, the second terminal 230, and the another terminal, for example, avatars of the user accounts, nicknames of the user accounts, battle effectiveness indexes of the user accounts, and service zones of the user accounts. The battle service module 224 is configured to provide a plurality of battle rooms for the users to battle, for example, a 1V1 battle room, a 3V3 battle room, a 5V5 battle room, and the like. The user-oriented I/O interface 225 is configured to establish communication between the first terminal 210 and/or the second terminal 230 by using a wireless network or a wired network for data exchange.

Figure 3:
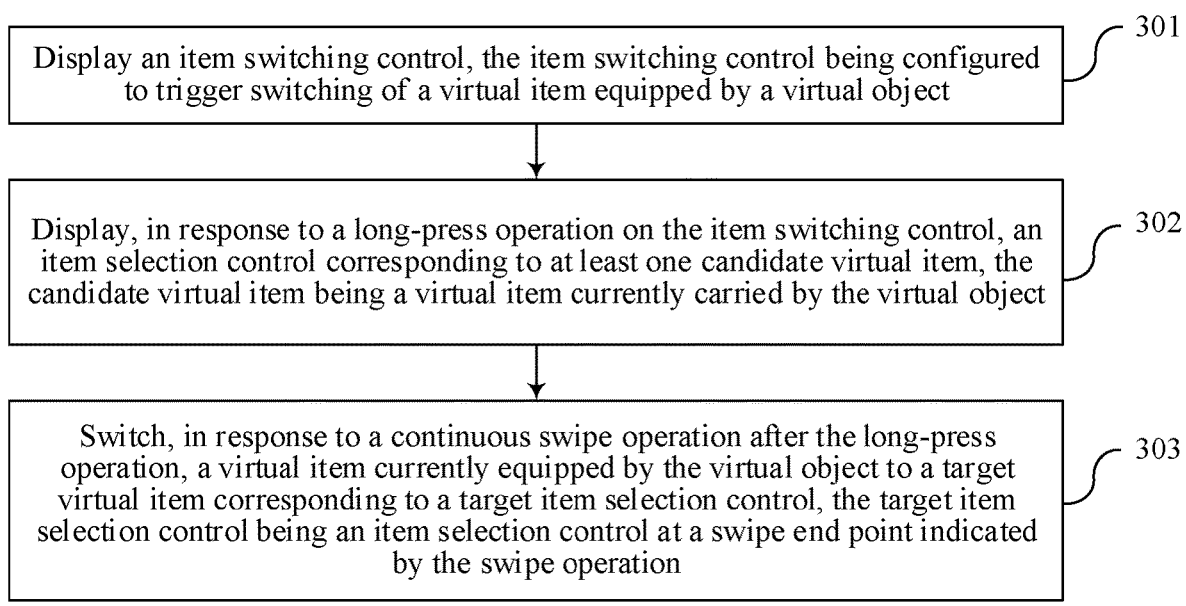
FIG. 3 is a flowchart of a method for switching a virtual item according to an exemplary embodiment of this disclosure.

FIG. 3 is a flowchart of a method for switching a virtual item according to an exemplary embodiment of this disclosure. This embodiment is described by using an example in which the method is applied to the first terminal 210 or the second terminal 230 in the implementation environment shown in FIG. 2 or the another terminal in the implementation environment. The method includes the following steps.

In step 301, an item switching control is displayed, the item switching control being configured to trigger switching of a virtual item equipped by a virtual object. In an example, an item selection element is displayed.

The method of this embodiment of this disclosure is applied to an application program supporting a virtual environment. The virtual environment includes a first virtual object and a second virtual object, and the first virtual object and the second virtual object belong to different camps. In a possible implementation, the terminal displays the virtual environment through a virtual environment image. In an example, the virtual environment image is an image obtained by observing the virtual environment from a perspective of a virtual object. Perspective is an observation angle for observation from a first-person perspective or a third-person perspective of a virtual object in a virtual environment. In some embodiments of this disclosure, the perspective is an angle for observing the virtual object by using a camera model in the virtual environment.

In an example, the camera model automatically follows the virtual object in the virtual environment. That is, when a position of the virtual object in the virtual environment changes, a position of the camera model following the virtual object in the virtual environment changes simultaneously, and the camera model is always within a preset distance range from the virtual object in the virtual environment. In an example, in the automatic following process, relative positions of the camera model and the virtual object remain unchanged.

In a possible implementation, an item switching control is displayed in a virtual environment interface. In an example, a display position of the item switching control in the virtual environment interface may be preset by a developer or customized by a user according to his operating habits, and the display position of the item switching control is not limited in this embodiment.

The item switching control is configured to switch a virtual item currently equipped by a virtual object controlled by the user. The currently equipped virtual item refers to a virtual item currently in use, that is, a virtual item that can be used directly.

Figure 4:
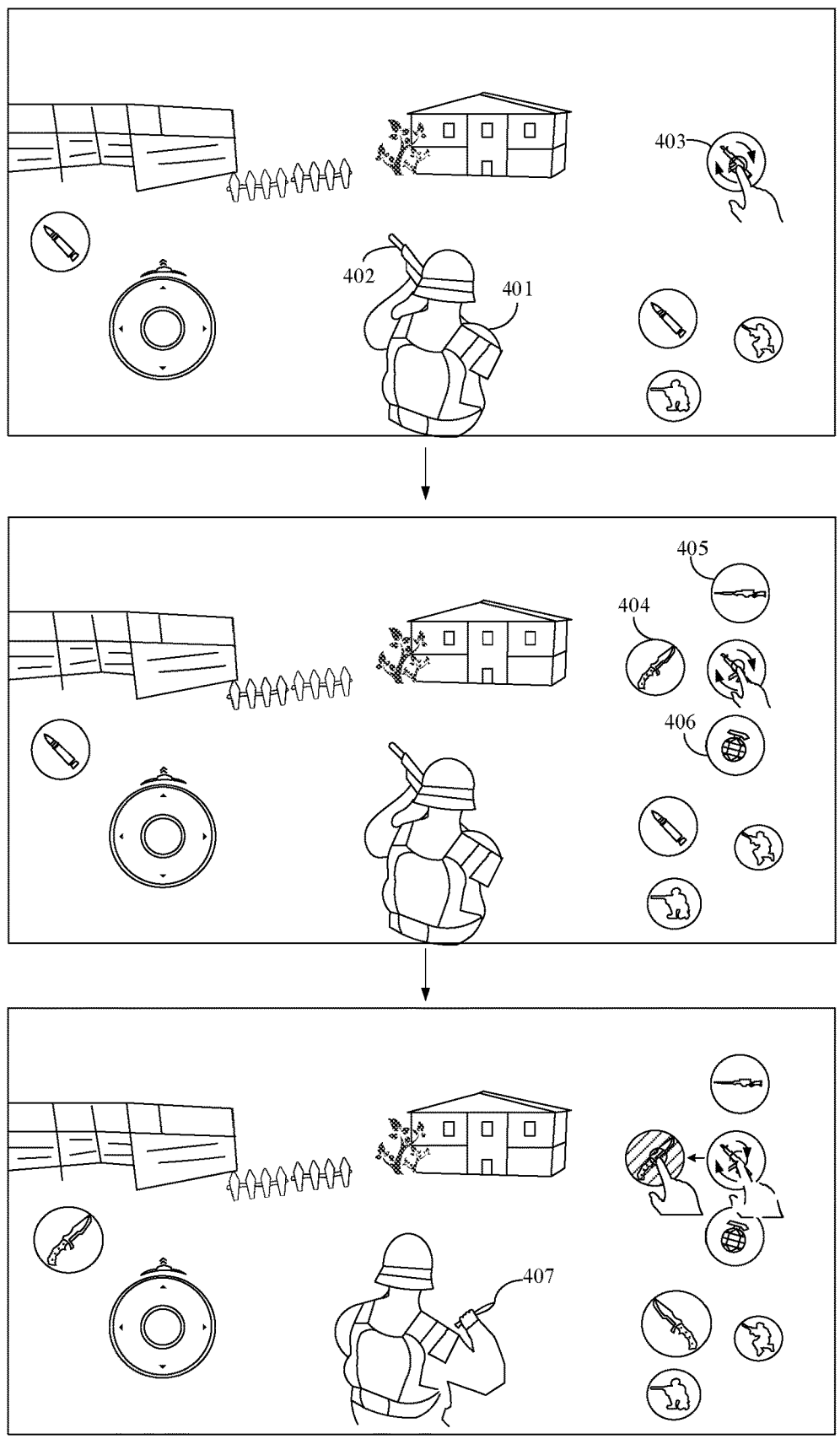
FIG. 4 is a schematic diagram of an interface of a virtual item switching process according to an exemplary embodiment of this disclosure.

For example, as shown in FIG. 4, the virtual environment interface includes a virtual object 401 controlled by the user, and displays an item switching control 403, which is configured to switch a virtual item equipped by the virtual object 401, such as a virtual item 402 held by the virtual object 401.

In step 302, in response to a long-press operation on the item switching control, an item selection control corresponding to at least one candidate virtual item is displayed, the candidate virtual item being a virtual item currently carried by the virtual object. In an example, an item selection control interface is displayed based on a continuous touch operation that is initially performed on the item selection element. The item selection control interface includes at least one candidate virtual item.

The candidate virtual item is a virtual item currently carried by the virtual object. In an example, the currently carried virtual item refers to all virtual items owned by a virtual object controlled by the user in the game, and the currently carried virtual items cannot be used directly, and can only be used after switching to virtual items equipped by the virtual object. The virtual items currently equipped by the virtual object are directly displayed in a virtual environment image, such as a virtual item held by the virtual object or an armor worn by the virtual object. If the virtual items currently carried by the virtual object can be stored in a storage item of the virtual object, such as a backpack, the virtual items do not need to be displayed in the virtual environment image. The carried virtual items may include virtual items obtained before a game starts, and may further include virtual items obtained in the game, such as virtual items obtained at a fixed or random location in the virtual environment, virtual items obtained from other virtual objects, and the like.

In a possible implementation, the long-press operation refers to an operation that a pressing at the same position in the interface reaches a preset time threshold. When the terminal receives the pressing operation on the item switching control, pressing time will be detected, and when the pressing time reaches the preset time threshold, at least one item selection control will be displayed. The item selection controls correspond to the candidate virtual items. The displayed item selection controls may be item selection controls corresponding to all candidate virtual items, or may be item selection controls corresponding to some candidate virtual items.

In an example, when at least one item selection control is displayed, for ease of triggering, the at least one item selection control will be displayed on or around the item switching control, that is, after long-pressing the item switching control, the item selection control will be displayed at a close range of the item switching control. For example, the at least one item selection control can be displayed on or around the item switching control in a wrapping form, a horizontal arrangement, or a vertical arrangement, so that the user can easily achieve a coherent long-press operation and swipe operation, and then quickly trigger the item selection control to complete the switching of the virtual items.

For example, as shown in FIG. 4, after receiving the long-press operation on the item switching control 403, item selection controls corresponding to the candidate virtual items will be displayed around the item switching control 403. The item selection controls include a first item selection control 404 corresponding to a virtual item A, a second item selection control 405 corresponding to a virtual item B, and a third item selection control 406 corresponding to virtual item C.

In step 303, in response to a continuous swipe operation after the long-press operation, a virtual item currently equipped by the virtual object is switched to a target virtual item corresponding to a target item selection control, the target item selection control being an item selection control at a swipe end point indicated by the swipe operation. In an example, the selected virtual item is determined as one of the at least one candidate virtual item included the item selection control interface when an end point of the continuous touch operation corresponds to the one of the at least one candidate virtual item in the item selection control interface.

In an embodiment of this disclosure, the virtual item currently equipped by the virtual object is switched through continuous long-press operation and swipe operation. A starting point of the swipe operation is the same as a pressing position of the long-press operation, and when the swipe operation is performed after the long-press operation, it will always keep in contact with the interface.

During the swipe period, when swiping to an item selection control, the item selection control will be highlighted to remind the user of a currently selected candidate virtual item. The highlighting may adopt at least one of a highlighted form, a shadow form, or an animation form. When the swipe operation ends, that is, after the swipe stops, the terminal determines an item selection control at the last swipe end point as a target item selection control, and determines a target virtual item corresponding to the target item selection control, and after the determination, the virtual item currently equipped by the virtual object is switched to the target virtual item corresponding to the target item selection control. Compared with the process of completing the switching of the virtual item through a plurality of click operations in the related art, the process of completing the switching through continuous long-press operation and swipe operation in embodiments of this disclosure is relatively simple, and due to the continuous operation, there is no need to perform a plurality of clicks in a virtual environment interface, thereby reducing the impact on a current normal operation.

For example, as shown in FIG. 4, when swiping to the first item selection control 404, the item selection control is highlighted. When the swipe operation ends, and an item selection control at a swipe end point is the first item selection control 404, it is determined as a target item selection control, and the virtual item 402 currently equipped by the virtual object is switched to the virtual item 407 corresponding to the first item selection control 404 to complete the switching of the virtual item.

Accordingly, in embodiments of this disclosure, when a user switches a virtual item currently equipped by a virtual object, an item selection control for displaying a candidate virtual item can be triggered by a long-press operation on the item switching control. In this case, after the user swipes to a target item selection control through a swipe operation, the virtual item can be switched to a target virtual item corresponding to the target item selection control. That is, switching of the virtual item can be realized through continuous long-press operation and swipe operation, without a need for a plurality of clicks in an interface, simplifying the operation of switching the virtual item, and improving the virtual item switching efficiency. In addition, compared with the related art, which requires a plurality of click operations in the interface to complete an item switching, the terminal needs to detect in real time whether there are click operations on positions of a plurality of specific controls. For example, a plurality of item switching controls, confirmation controls, interface off controls, and the like. However, in this disclosure, the item switching can be performed through a continuous long-press and swipe operation, and only a position after the swipe ends needs to be detected, which can reduce the touch detection power consumption of the terminal; and the item switching is performed through a special gesture operation of long-press and swipe operation, compared with the click operation, the probability of an accidental touch can be reduced.

In an embodiment of this disclosure, since the item selection control is displayed around the item switching control, when there are a plurality of candidate virtual items, if the item selection controls corresponding to all the candidate virtual items are displayed, the display area is large, which may cause a large occlusion on the virtual environment image, and it is difficult to swipe to the target item selection control, which affects the switching efficiency of the virtual items. Therefore, in a possible implementation, when the item selection control is displayed, it is determined whether the candidate virtual items need to be screened according to an item quantity of the candidate virtual items, which will be described with an exemplary embodiment below.

Figure 5:
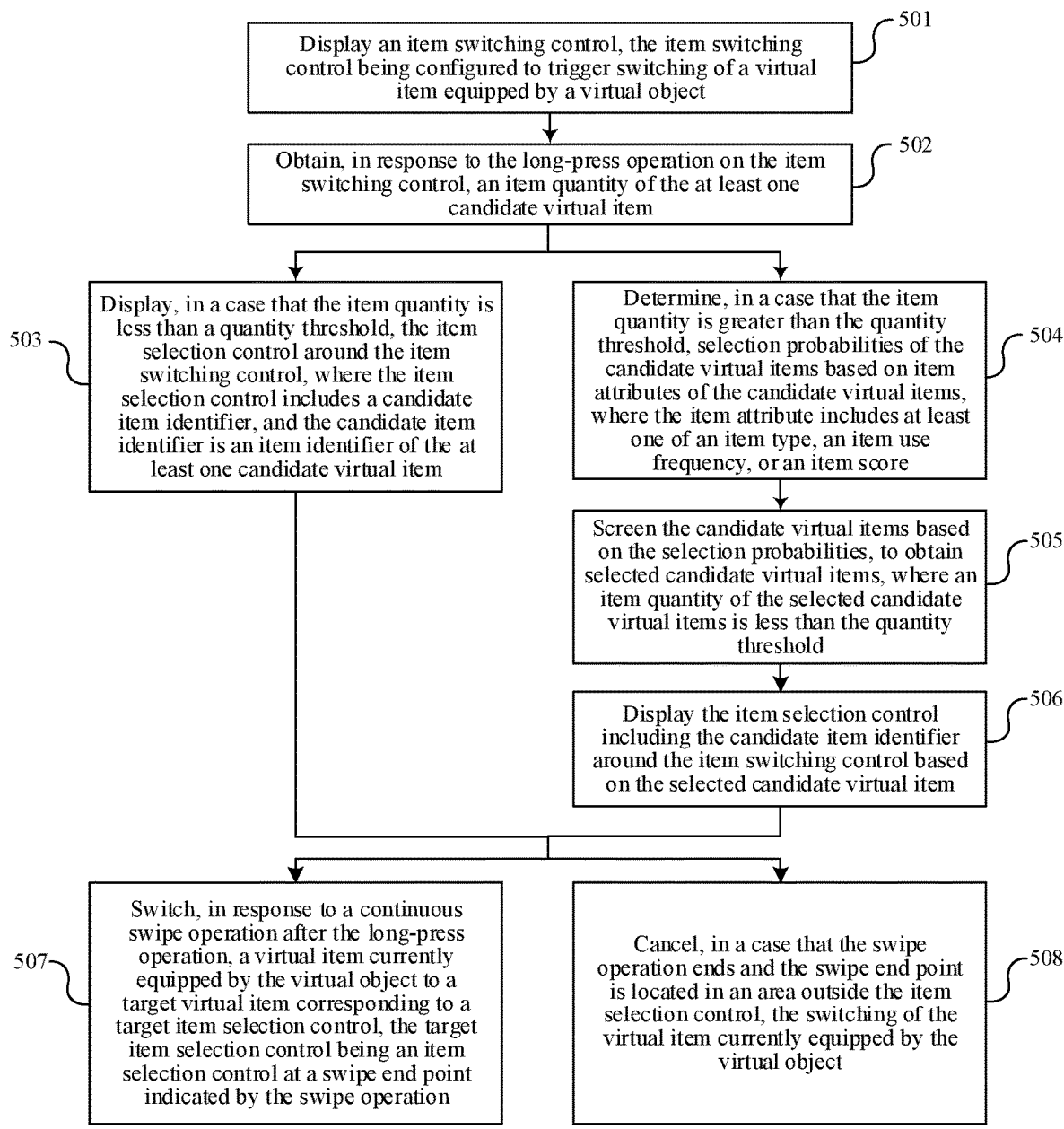
FIG. 5 is a flowchart of a method for switching a virtual item according to another exemplary embodiment of this disclosure.

FIG. 5 is a flowchart of a method for switching a virtual item according to an exemplary embodiment of this disclosure. This embodiment is described by using an example in which the method is applied to the first terminal 210 or the second terminal 230 in the implementation environment shown in FIG. 2 or the another terminal in the implementation environment. The method includes the following steps.

In step 501, an item switching control is displayed, the item switching control being configured to trigger switching of a virtual item equipped by a virtual object.

For an exemplary implementation of this step, reference may be made to step 301, and details are not described again in this embodiment.

In step 502, in response to the long-press operation on the item switching control, an item quantity of the at least one candidate virtual item is obtained.

Due to a limited display area of the item selection control, and an item quantity of the candidate virtual items carried by the virtual object may be relatively large, to prevent the display of more item selection controls from seriously occluding the current interface, in a possible implementation, it may be determined whether the candidate virtual items need to be further screened according to the item quantity of the candidate virtual items, to select the item selection controls of the candidate virtual items to be displayed. For example, when the terminal receives a long-press operation on the item switching control, an item quantity of the virtual items currently carried by the virtual object is first obtained, and then it is determined whether to display item selection controls of all candidate virtual items based on the item quantity.

In step 503, in a case that the item quantity is less than a quantity threshold, the item selection control is displayed around the item switching control, where the item selection control includes a candidate item identifier, and the candidate item identifier is an item identifier of the at least one candidate virtual item.

In an example, the quantity threshold is pre-stored in the terminal, and the quantity threshold indicates a maximum quantity of the item selection controls corresponding to the candidate virtual items that can be displayed. When the obtained item quantity is less than the quantity threshold, it indicates that there are fewer current candidate virtual items, and the item selection controls corresponding to all the candidate virtual items can be displayed on the virtual environment interface, that is, the item selection controls of the candidate virtual items are displayed on or around the item switching controls.

The quantity threshold may be a fixed value or a dynamically changing value. The quantity threshold may indicate a maximum quantity of the item selection controls that can be displayed, and the displayed quantity of the item selection controls is related to a screen size of a terminal display screen. The corresponding quantity threshold can be dynamically adjusted based on the screen size of the terminal display screen. The larger the screen size of the terminal display screen, the larger the quantity threshold can be, so that when the display screen is larger, more item selection controls are displayed for the user to choose.

A developer can pre-calculate a display screen size corresponding to each type of terminals, and then adapt to an appropriate quantity threshold, and transmit a correspondence between the screen size and the quantity threshold to a game application, so that in an actual application process, an appropriate quantity threshold can be determined according to the obtained terminal screen size of the current terminal.

To enable the user to clarify the correspondence between the item selection controls and the candidate virtual items, and to avoid wrong selection, a candidate item identifier corresponding to the candidate virtual item may be displayed in the item selection control, that is, the item selection control corresponding to the candidate virtual item is a control including a candidate item identifier, and the candidate item identifier is used for identifying a unique virtual item. The candidate item identifier may be at least one of a thumbnail of a virtual item, a virtual item name, or the like.

When the item selection control is displayed on or around the item switching control, at least one of a circular arrangement, a triangular arrangement, a square arrangement, a tile arrangement or a welt arrangement can be selected for arrangement. In addition, each arrangement corresponds to a fixed display position. In a possible implementation, since different arrangements display different occupied areas, to avoid occupying a larger display area, different quantity thresholds may be set for different arrangements, for example, a corresponding quantity threshold of the square arrangement is 8, a corresponding quantity threshold of the triangular arrangement is 6, and a corresponding quantity threshold of the welt arrangement is 5.

In addition, due to different display sizes of different arrangements, correspondingly, the degree of occlusion of the virtual environment image is also different, and when the item selection controls are displayed in various arrangements, the distances between the item selection controls and the item switching controls are also different. For example, when the circular arrangement is adopted, the distances between the item selection controls and the item switching controls are the same, the virtual item switching efficiency is higher, but the occupied display area is larger, while when the welt arrangement is adopted, the occupied display area is smaller, but the distances between the item selection controls and the item switching controls are different, and there are item selection controls that are far away, correspondingly, the item switching efficiency is lower. Therefore, in a possible implementation, the arrangement can be determined according to different current application scenarios. If the current application scenario has a high demand for the switching efficiency, a circular arrangement or a square arrangement can be adopted, for example, a scene in the battle; and if the current application scenario has a high demand for the display of a virtual environment interface, to avoid excessive occlusion, a welt arrangement can be adopted, for example, observing a scene of a virtual environment image.

When displaying the item selection control, it is displayed according to the display position corresponding to the selected arrangement. In a possible implementation, the candidate item identifiers of the candidate virtual items can be displayed in any item selection control, and when the item selection controls including the candidate item identifiers are displayed, the item selection controls that do not include the candidate item identifiers can also be displayed at the same time. That is, the quantity of the item selection controls may be the same as the quantity of the candidate virtual items, or the quantity of the item selection controls may be greater than the quantity of the candidate virtual items, that is, there are spare item selection controls.

Figure 6:
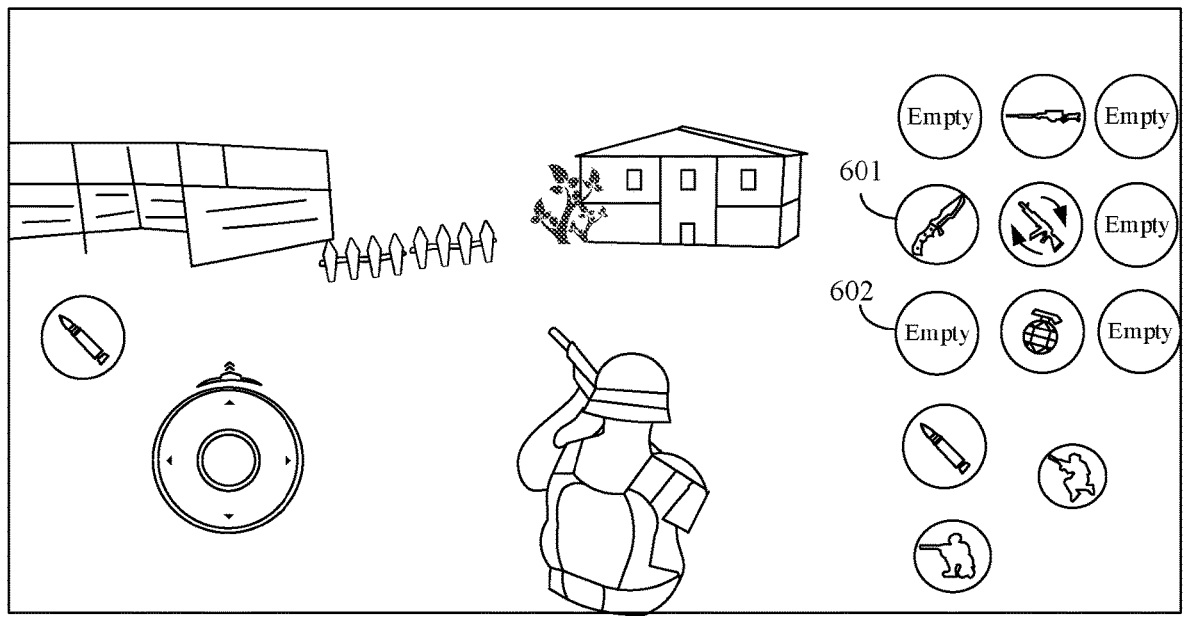
FIG. 6 is a schematic diagram of an interface of an arrangement of an item selection control according to an exemplary embodiment of this disclosure.

For example, as shown in FIG. 6, the item selection controls adopt a square arrangement, and in the item selection controls, there are item selection controls 601 including the candidate item identifiers and item selection controls 602 not including the candidate item identifiers.

Since the display position of each item selection control is not the same as the distance or direction between the item switching controls, the difficulty of swiping to each item selection control is also different. To further improve the item switching efficiency, in another possible implementation, display positions of the candidate item identifiers may be determined based on selection probabilities of the candidate virtual items, that is, the display positions of the item selection controls are determined, and the candidate item identifiers are displayed in this manner may include the following substeps 503a and 503b.

In substep 503a, a display position of the candidate item identifier is determined based on an item attribute of the candidate virtual item, where the item attribute includes at least one of an item type, an item use frequency, or an item score.

To improve the item switching efficiency, for example, an item selection control of a candidate virtual item with a higher item use frequency is displayed in a position or direction that is more easily triggered, so that the user can switch to the candidate virtual item more easily. Therefore, in a possible implementation, by comparing item attributes of the candidate virtual items, such as an item type, an item use frequency, an item score, or the like, with the goal of displaying item selection controls of the candidate virtual items that are more likely to meet current switching needs of the user in a position or direction that is more likely to be triggered, the display positions of the candidate item identifiers (the item selection controls) are determined.

In an example, determining the display position of the candidate item identifier according to the item attribute of the candidate virtual item may include the following steps 1 to 2.

Step 1: Determine a selection probability of the candidate virtual item based on the item attribute of the candidate virtual item.

In an example, the selection probability refers to a probability that the candidate virtual item is used as a target virtual item, and when determining the display position based on the item attribute, the user is expected to select a candidate virtual item with a higher probability and display the candidate virtual item in a position that is more easily triggered by the user. Therefore, in a possible implementation, the selection probability that each candidate virtual item may be selected by the user may be determined based on the item attribute of the candidate virtual item. The item attribute of the candidate virtual item includes at least one of an item type, an item use frequency, or an item score. The item type can be classified according to the function of the candidate virtual items, the item use frequency can be obtained according to historical item use records, and the item score can be determined according to at least one of item equipment accessories, item attack power/defense power, or item rarity. A quantity of the item equipment accessories, the item attack power/defense power and the item rarity are positively correlated with the item score.

In an example, both the item use frequency and the item score are positively correlated with the selection probability of the candidate virtual item, and the candidate virtual item of the same type as the virtual item type currently equipped by the virtual object has a higher selection probability. In a possible implementation, the selection probability may be determined based on one of an item type, an item use frequency, and an item score, or may be determined based on the three together. When the selection probability is jointly determined according to the three, different weights can be set respectively, and the selection probability can be obtained by the weighted average. For example, the item type accounts for 30%, the item use frequency accounts for 30%, and the item score accounts for 40%. This embodiment only gives an exemplary description for this, and not limited thereto.

Step 2: Determine the display position of the candidate item identifier based on the selection probability and a preferred position, where the preferred position is determined based on a historical operation record, and a distance between the display position and the preferred position is negatively correlated with the selection probability.

Different users have different operation habits during the game. For example, some users are more accustomed to swiping to the right, and some users prefer to swipe to the left. To display the item selection controls of the candidate virtual items with higher selection probabilities in a position where the user is more accustomed to performing the operation, so as to facilitate the user to swipe when switching the items, in a possible implementation, after the terminal determines the selection probability of each candidate virtual item, a preferred position of the user needs to be further obtained, and then the display position of the candidate item identifier (the item selection control) is comprehensively determined based on the preferred position and the selection probability. The preferred position refers to a position that is convenient for the user to trigger. The preferred position can be determined according to the historical operation record, and a swipe operation with the highest frequency in the historical operation record can be obtained. According to the swiping direction indicated by the swipe operation with the highest frequency, the target direction of the preferred position in the item switching control is determined, and then the display position at the target direction is determined as the preferred position. For example, in the historical operation record, if the frequency of swiping to the right is the highest, it indicates that the user is accustomed to swiping to the right. In this case, the position on the right side of the item switching control is the preferred position.

In a possible implementation, the display position of the candidate item identifier can be jointly determined by the selection probability of the candidate virtual item and the preferred position. A candidate item identifier corresponding to a candidate virtual item with a high selection probability may be displayed in an item selection control closer to the preferred position, that is, the display position of the candidate item identifier is negatively correlated with the preferred position.

In step 503b, the item selection control including the candidate item identifier is displayed around the item switching control based on the display position.

After the display position of each candidate item identifier is determined, the candidate item identifier is displayed at the item selection control corresponding to the display position.

The virtual items currently carried by the virtual object may include the same candidate virtual items. In an example, the corresponding candidate item identifiers are the same, and the same candidate virtual items may have item differences, such as different accessories, different appearances, or the like. However, since the candidate item identifiers are the same, when the items are switched, it is easy to cause interference and affect the identification of the candidate virtual items. Therefore, in a possible implementation, when the terminal determines that there are at least two candidate virtual items corresponding to the same candidate item identifier, the terminal may determine an item difference of the at least two candidate virtual items. In an example, the item difference may be determined only when there are identical candidate item identifiers that will cause interference to item selection. Therefore, a corresponding item difference between the candidate virtual items of the same candidate item identifiers is determined only when there are at least two identical candidate item identifiers. For example, there are two first virtual items in the candidate virtual items. A first virtual item A is equipped with an 8× sight, and a first virtual item B is equipped with a 2× sight, then an item difference between the first virtual item A and the first virtual item B is a magnification mirror.

After the item difference is determined, an item selection control including the candidate item identifier and a difference identifier is displayed on or around the item switching control, and the difference identifier is used for indicating the item difference. The difference identifier can be at least one of an image diagram or a text description of an item difference. When the candidate item identifier is marked with a difference identifier, the displayed difference identifier is located at the same item selection control as the candidate item identifier.

Figure 7:
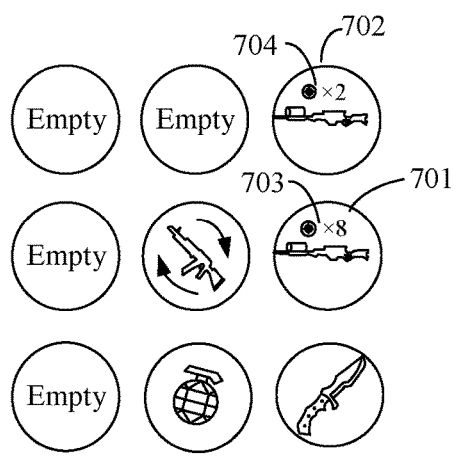
FIG. 7 is a schematic diagram of an interface of an arrangement of an item selection control according to another exemplary embodiment of this disclosure.

For example, as shown in FIG. 7, a first item selection control 701 is an item selection control of the first virtual item A, and a second item selection control 702 is an item selection control of the first virtual item B. In this case, a first difference identifier 703 is displayed in the first item selection control 701 corresponding to the first virtual item A, which includes a magnification description (×8), and a second difference identifier 704 is displayed at the second item selection control 702 corresponding to the first virtual item B, which includes a magnification description (×2) to prompt the user, indicating that both the first virtual item A and the first virtual item B are first virtual items, but they have different magnifications.

In addition, it is determined that a current preferred position of the user is the right position of the item switching control, then the first item selection control 701 with the highest selection probability is set at the right position of the item switching control, and its display position is the closest to the preferred position.

In step 504, in a case that the item quantity is greater than the quantity threshold, selection probabilities of the candidate virtual items are determined based on item attributes of the candidate virtual items, where the item attribute includes at least one of an item type, an item use frequency, or an item score.

To avoid displaying the item selection controls corresponding to all candidate virtual items and occluding the terminal screen, in a possible implementation, when the terminal determines that an item quantity of the virtual items carried by the current virtual object exceeds a quantity threshold, to avoid the occlusion of the screen and the impact on the switching efficiency, the candidate virtual items are screened. Only the candidate item identifiers and the item selection controls corresponding to some candidate virtual items are displayed. For example, only the item selection controls of the candidate virtual items with higher selection probabilities are displayed (the item selection controls include the candidate item identifiers).

The candidate virtual items may be screened according to selection probabilities of the candidate virtual items. The selection probabilities are determined according to item attributes of the candidate virtual items, and the determination manner may refer to step 1 in the foregoing step 503a, and details are not described in this embodiment again.

In step 505, the candidate virtual items are screened based on the selection probabilities, to obtain selected candidate virtual items, where an item quantity of the selected candidate virtual items is less than the quantity threshold.

When screening the candidate virtual items, it can be screened together according to the quantity threshold and the selection probabilities. A target quantity for screening the candidate virtual items can be determined first, and the target quantity needs to be less than or equal to the quantity threshold, and further, the candidate virtual items are selected in sequence according to the order of the selection probabilities of the candidate virtual items, and finally, the selected candidate virtual items are obtained. For example, when the quantity threshold is 8, and the target quantity is 7, then during screening, candidate virtual items whose selection probabilities rank top 7 are selected to obtain the selected candidate virtual items.

In step 506, the item selection control including the candidate item identifier around the item switching control is displayed based on the selected candidate virtual item.

After screening, the item selection controls including the candidate item identifiers corresponding to the selected candidate virtual items are displayed on or around the item switching control based on the selected candidate virtual items. Each candidate item identifier may be displayed in any item selection control, or a display position of each candidate item identifier may be determined first, and displayed in the item selection control based on the display position.

In step 507, in response to a continuous swipe operation after the long-press operation, a virtual item currently equipped by the virtual object is switched to a target virtual item corresponding to a target item selection control, the target item selection control being an item selection control at a swipe end point indicated by the swipe operation.

For an exemplary implementation of this step, reference may be made to step 303, and details are not described again in this embodiment.

After the item selection control is displayed around the item switching control based on the selected candidate virtual items, the selection probability of each candidate virtual item may be updated based on the target item selection control indicated by a swipe operation of the user. For example, if the user does not click on an item selection control of any candidate virtual item displayed after screening, it means that the screening result is different from an expected behavior of the user, and the selection probability of each candidate virtual item can be appropriately lowered; and if the user clicks on a target item selection control, the selection probability of the candidate virtual item is appropriately increased, so that the candidate virtual item can be preferentially displayed in a more easily operable display position in the future.

In step 508, in a case that the swipe operation ends and the swipe end point is located in an area outside the item selection control, the switching of the virtual item currently equipped by the virtual object is canceled.

In a possible implementation, there may not be an item selection control at the swipe end point indicated by the swipe operation, that is, the swipe end point is located in an area outside the item selection control. In this case, the terminal will cancel the switching of the virtual items currently equipped by the virtual object. That is, when the switching of the virtual items needs to be canceled, it only needs to swipe to the item selection control outside the item selection control or the item selection control that does not include the candidate item identifier, and the cancellation can be completed, and there is no need to cancel the switching by triggering an additional cancellation control, which further improves the virtual item switching efficiency.

In an embodiment, whether to screen the candidate virtual items is determined according to the item quantity of the candidate virtual items. If screening is performed according to the item attributes of the candidate virtual items, it is ensured that the selected candidate virtual items have higher selection probabilities, and since only item selection controls corresponding to the selected virtual items are displayed, the degree of occlusion to the virtual environment image can be reduced, and the distance between the display position of the item selection control and the item switching control can be avoided, which affects the virtual item switching efficiency.

In addition, in an embodiment, a display position of each item selection control is determined according to the selection probabilities of the candidate virtual items and preferred positions of the user, so that the item selection controls corresponding to the candidate virtual items with higher selection probabilities are displayed near the preferred positions, which further improves the virtual item switching efficiency.

In the foregoing embodiment, when the item quantity is greater than the quantity threshold, the candidate virtual items will be screened, and only candidate item identifiers of the selected candidate virtual items will be displayed, which is configured to switch the items. In this way, an item selection control corresponding to a target virtual item that the user needs to switch may not be displayed, and it cannot be switched to the target virtual item. Therefore, in another possible implementation, the candidate virtual items may be classified, the item selection controls may be displayed based on item types of the candidate virtual items, and the process of displaying the item selection controls corresponding to the candidate items may include the following steps 1 to 3.

Step 1: Obtain, in a case that an item quantity is greater than a quantity threshold, item types of candidate virtual items.

When an item quantity of the obtained candidate virtual items is greater than a quantity threshold, item types of the candidate virtual items are first obtained. The item types can be divided according to their functions, including attack, defense, and supply, and can be further divided, for example, attack includes a long-range attack, a melee attack, throwing, or the like. An item type corresponding to each candidate virtual item is determined according to the function and action mode of each candidate virtual item.

Step 2: Display, based on type identifiers corresponding to the item types, a type selection control including the type identifier around the item switching control.

In a possible implementation, after obtaining an item type of each candidate virtual item, it is determined that all item types are covered by the candidate virtual items, and a type identifier corresponding to each item type is determined. The type identifier can be at least one of a text identifier or a pattern identifier.

After the type identifier of each item type is determined, a type selection control including the type identifier is displayed on or around the item switching control. The arrangement can also be at least one of a circular arrangement, a triangular arrangement, a square arrangement, a tile arrangement or a welt arrangement, and each type identifier can be displayed in any type selection control. This embodiment does not limit the arrangement of the type selection controls including the type identifiers and display positions of each type identifier.

Figure 8:
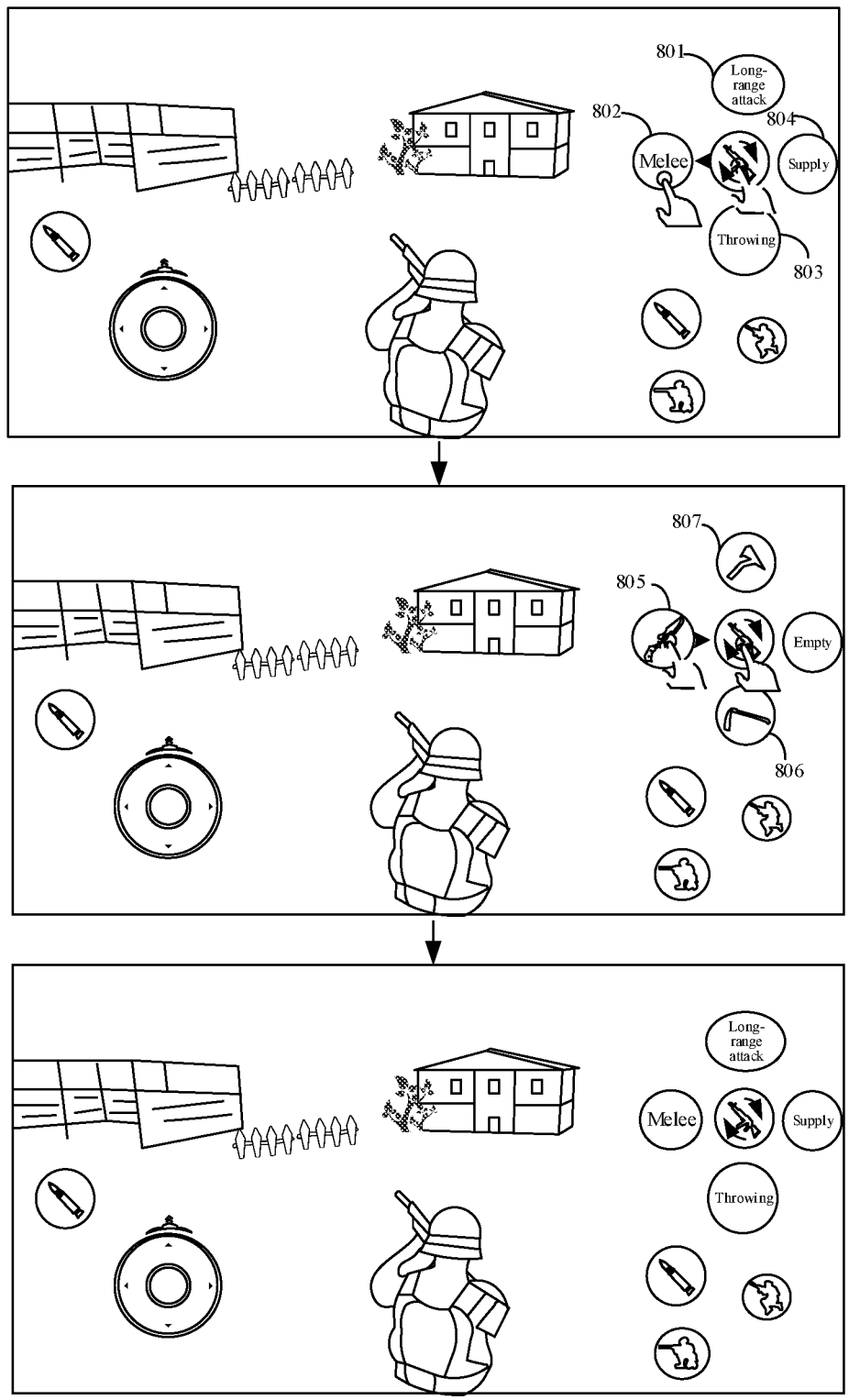
FIG. 8 is a schematic diagram of a display of an item selection control according to an exemplary embodiment of this disclosure.

For example, as shown in FIG. 8, when the item quantity is greater than the quantity threshold, type selection controls including the type identifiers corresponding to the item types of the candidate virtual items will be displayed, including a long-range attack type selection control 801, a melee type selection control 802, a throwing type selection control 803, and a supply type selection control 804.

Step 3: Display, in response to the continuous swipe operation after the long-press operation, and a stay duration of the swipe operation on a target type selection control reaching a first duration threshold, the item selection control corresponding to the candidate virtual item of a target item type, where the target item type is an item type corresponding to the target type selection control.

Since it is the item selection control including the type identifier, not the item selection control including the candidate item identifier, that is currently displayed on or around the item switching control, the virtual item cannot be switched. Therefore, in a possible implementation, when the swipe operation after the long-press operation swipes to a target type selection control, and a stay duration of the target type selection control reaches a first duration threshold, the item selection control including the candidate item identifier will be displayed. The candidate item identifier refers to an item identifier corresponding to the candidate virtual item of the target item type, and the target item type corresponds to the target type selection control.

When displaying the item selection control including the candidate item identifier, the type selection control originally displayed on or around the item switching control can be replaced with the item selection control, and after replacing the type selection control with the item selection control, if the type selection control needs to be displayed again, the item selection control can be restored to the type selection control by continuing to swipe to the item switching control.

Alternatively, the item selection controls can also be directly displayed on or around the target type selection controls, that is, the item selection controls are displayed while retaining the various types of the selection controls.

After the item selection control is displayed, the user can continue the swipe operation, swipe to the item selection control corresponding to the target virtual item, and switch the virtual item currently equipped by the virtual object to the target virtual item.

For example, as shown in FIG. 8, when a stay duration of the swipe operation at the melee type selection control 802 reaches a first duration threshold, the terminal changes the type selection control to an item selection control including an item identifier of the melee type virtual item, including a dagger selection control 805, a sickle selection control 806, and an axe selection control 807. When swiping to the item switching control again, the item selection control is replaced with a type selection control.

In an embodiment, when the item quantity of candidate virtual items is relatively large, an item type of each candidate virtual item will be determined, and when the terminal receives the swipe operation after the long-press operation, and a stay duration of the swipe operation at the target type selection control reaches a first duration threshold, the item selection control corresponding to the candidate virtual item belonging to the target item type will be displayed for switching the virtual items. In this way, the item selection controls of all candidate virtual items can be displayed, and the user can switch the virtual item currently equipped by the virtual object to any candidate virtual item, and during the switching process, the degree of occlusion on the virtual environment image is lower, which can reduce the impact on the display of the virtual environment image.

In a possible implementation, to remind the user of the current long-press duration on the item switching control, a trigger progress bar will be displayed in the user interface to display the current long-press duration. In addition, in order for the user to learn each candidate virtual item when switching the items, item information of the candidate virtual item may be further displayed, which will be described with an exemplary embodiment below.

Figure 9:
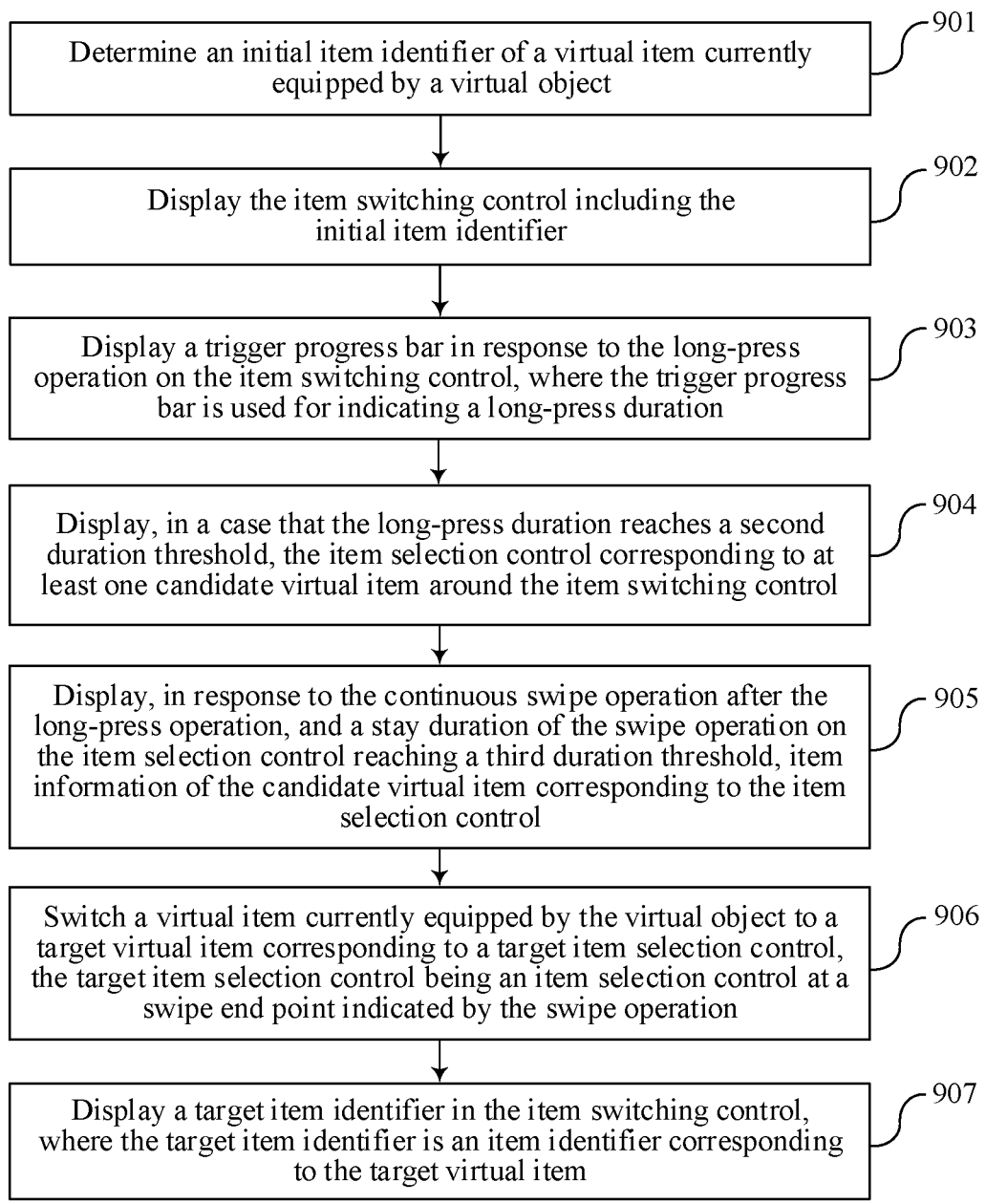
FIG. 9 is a flowchart of a method for switching a virtual item according to another exemplary embodiment of this disclosure.

FIG. 9 is a flowchart of a method for switching a virtual item according to an exemplary embodiment of this disclosure. This embodiment is described by using an example in which the method is applied to the first terminal 210 or the second terminal 230 in the implementation environment shown in FIG. 2 or the another terminal in the implementation environment. The method includes the following steps.

In step 901, an initial item identifier of a virtual item currently equipped by a virtual object is determined.

In a possible implementation, an item switching control may include an item identifier of the virtual item currently equipped by the virtual object to remind the user. Therefore, when displaying the item switching control, an initial item identifier of the virtual item currently equipped by the virtual object is first obtained, so as to display the initial item identifier in the item switching control.

The initial item identifier may be an item name, an item thumbnail, etc. of the virtual item.

In step 902, the item switching control including the initial item identifier is displayed.

Figure 10:
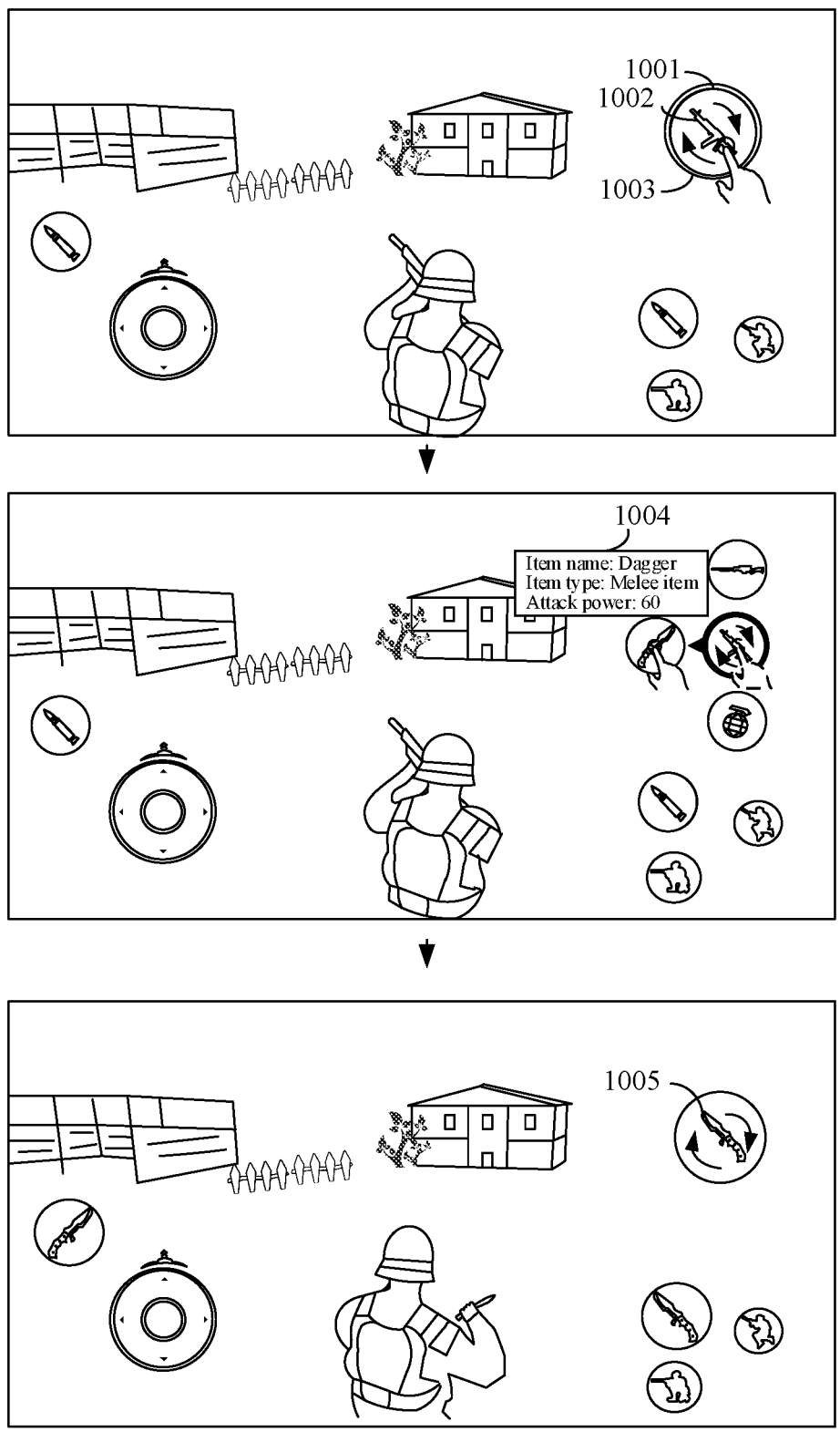
FIG. 10 is a schematic diagram of an interface of a virtual item switching process according to another exemplary embodiment of this disclosure.

For example, as shown in FIG. 10, the displayed item switching control 1001 includes an initial item identifier 1002 of the virtual item currently equipped by the virtual object.

In step 903, a trigger progress bar is displayed in response to the long-press operation on the item switching control, where the trigger progress bar is used for indicating a long-press duration.

In a possible implementation, to remind the user of the current long-press duration on the item switching control, when the terminal receives the long-press operation on the item switching control, a trigger progress bar is displayed. The trigger progress bar can be displayed in the form of a circle, a rectangle and a digital countdown, and is displayed on or around the item switching control.

In an example, the trigger progress bar can also be displayed on the item switching control. For example, the trigger progress bar is displayed around the item switching control, and a full progress status of the trigger progress bar is a perimeter of the item switching control.

For example, as shown in FIG. 10, when a long-press operation on the item switching control 1001 is received, a trigger progress bar 1003 will be displayed.

In step 904, in a case that the long-press duration reaches a second duration threshold, the item selection control corresponding to at least one candidate virtual item is displayed around the item switching control.

In an example, when the long-press duration reaches the second duration threshold, the long-press operation can end. In this case, the item selection control corresponding to at least one candidate virtual item will be displayed around the item switching control, and correspondingly, the trigger progress bar will remain in a full progress status.

The second duration threshold may be set by a developer, for example, the second duration threshold is 1 s.

As shown in FIG. 10, when the trigger progress bar 1003 reaches the full progress status, the item selection control corresponding to at least one candidate virtual item will be displayed around the item switching control 1001.

In step 905, in response to the continuous swipe operation after the long-press operation, and a stay duration of the swipe operation on the item selection control reaching a third duration threshold, item information of the candidate virtual item corresponding to the item selection control is displayed.

To facilitate understanding of the candidate virtual item, in a possible implementation, when a stay duration of the swipe operation after the long-press operation on the item selection control reaches the third duration threshold, item information corresponding to the candidate virtual item will be displayed.

The third duration threshold may be set by a developer, for example, the third duration threshold is 1.5 s; and the second duration threshold may be the same as the third duration threshold, or the second duration threshold may be different from the third duration threshold.

In an example, the displayed item information includes: at least one of an item name, an item attribute value, or an item function.

For example, as shown in FIG. 10, when a stay duration of the swipe operation on the item selection control corresponding to the dagger reaches a third duration threshold, item information 1004 of the dagger will be displayed. The item information 1004 includes an item name, an item type and an item attack power.

In step 906, a virtual item currently equipped by the virtual object is switched to a target virtual item corresponding to a target item selection control, the target item selection control being an item selection control at a swipe end point indicated by the swipe operation.

For an exemplary implementation of this step, reference may be made to step 303, and details are not described again in this embodiment.

In step 907, a target item identifier is displayed in the item switching control, where the target item identifier is an item identifier corresponding to the target virtual item.

In an example, after switching the virtual item currently equipped by the virtual object, the item identifier of the switched target virtual item needs to be displayed in the item switching control to remind the user that the replacement has been completed, and correspondingly, other item switching controls will no longer be displayed, and there is no need to close them through additional controls or additional operations.

For example, as shown in FIG. 10, after the virtual item currently equipped by the virtual object is switched a dagger, a dagger identifier 1005 will be displayed in the item switching control 1001, the update of the item switching control 1001 is completed, and after the switching is completed, the item selection control around the item switching control 1001 is no longer displayed.

In an embodiment, the user is reminded of the current long-press duration through a trigger progress bar, which is convenient for the user to grasp the duration. In addition, when the terminal receives the continuous swipe operation after the long-press operation, and a stay duration of the swipe operation on the item selection control reaches a third duration threshold, the item information corresponding to the candidate virtual item will be displayed, so that the user can understand each candidate virtual item and improve the accuracy of virtual item switching.

Figure 11:
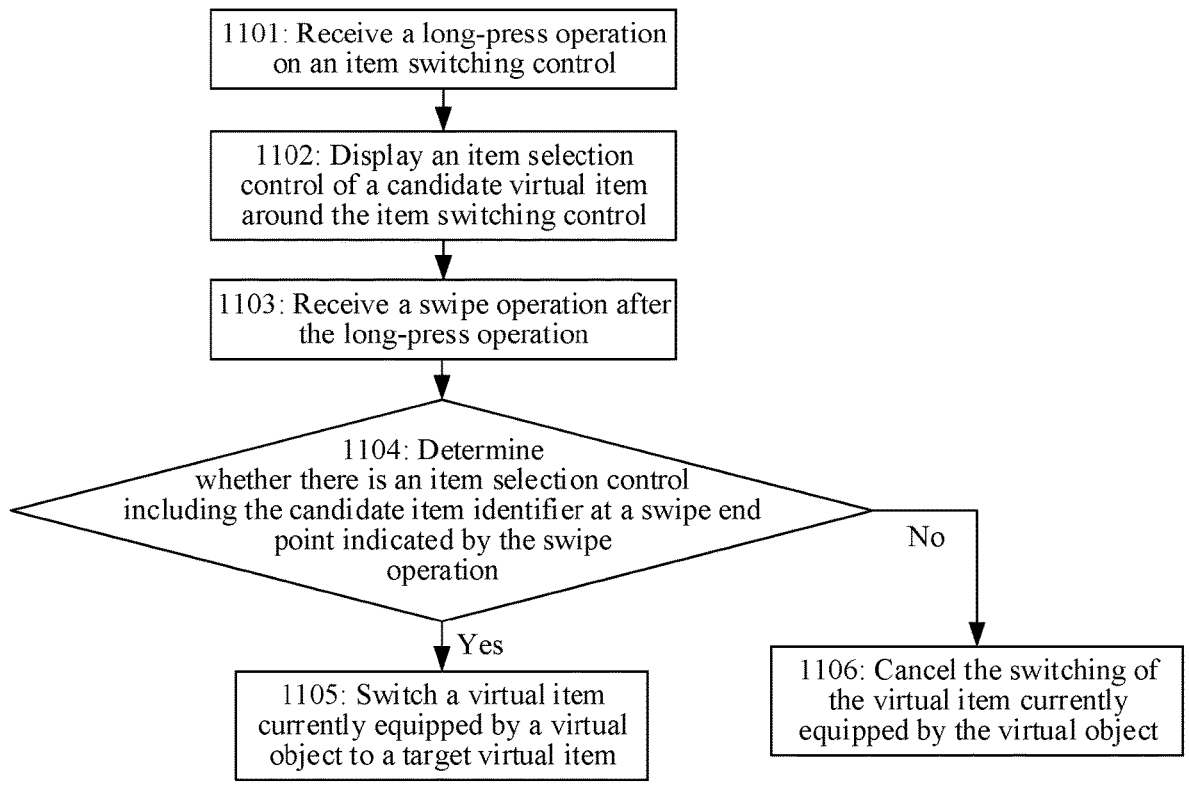
FIG. 11 is a flowchart of a virtual item switching process according to another exemplary embodiment of this disclosure.

With reference to the foregoing embodiments, in an exemplary example, the switching process of the virtual item is shown in FIG. 11.

In step 1101, a long-press operation on an item switching control is received.

In step 1102, an item selection control of a candidate virtual item is displayed around the item switching control.

In step 1103, a swipe operation after the long-press operation is received.

A starting point of the swipe operation is a long-press position of the long-press operation, and an end time of the long-press operation is a start time of the swipe operation, that is, the swipe operation after the long-press operation is a continuous operation.

In step 1104, a determination is made as to whether there is an item selection control including the candidate item identifier at a swipe end point indicated by the swipe operation, and if so, perform step 1105; and if not, perform step 1106.

In step 1105, a virtual item currently equipped by a virtual object is switched to a target virtual item.

When there is an item selection control including the candidate item identifier at the swipe end point of the swipe operation, the virtual item currently equipped by the virtual object is switched to a target virtual item. In addition, after the target virtual item switching is completed, the item selection control displaying the candidate virtual item will be automatically canceled, and there is no need to manually exit an item switching scene.

The target virtual item is a virtual item corresponding to a candidate item identifier at a swipe end point.

In step 1106, the switching of the virtual item currently equipped by the virtual object is canceled.

When there is no item selection control including the candidate item identifier at the swipe end point of the swipe operation, the virtual item switching is directly canceled.

The information (including but not limited to user equipment information, user personal information, and the like), data (including but not limited to data for analysis, stored data, displayed data, and the like) and signals involved in this disclosure are both authorized by the user or fully authorized by all parties, and the collection, use and processing of relevant data need to comply with relevant laws, regulations and standards of relevant countries and regions. For example, user operation data such as the user preferred position and the item use frequency involved in this disclosure are all obtained with full authorization.

Figure 12:
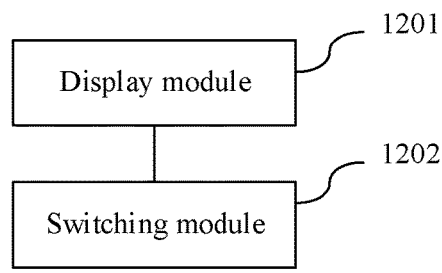
FIG. 12 is a structural block diagram of an apparatus for switching a virtual item according to an exemplary embodiment of this disclosure.

FIG. 12 is a structural block diagram of an apparatus for switching a virtual item according to an exemplary embodiment of this disclosure. The apparatus may be disposed on a first terminal 210 or a second terminal 230 or another terminal in the implementation environment shown in FIG. 2. The apparatus includes a display module 1201 and a switching module 1202. One or more modules, submodules, and/or units of the apparatus can be implemented by processing circuitry, software, or a combination thereof, for example.

The display module 1201 is configured to display an item switching control, the item switching control being configured to trigger switching of a virtual item equipped by a virtual object. The display module 1201 is further configured to display, in response to a long-press operation on the item switching control, an item selection control corresponding to at least one candidate virtual item, the candidate virtual item being a virtual item currently carried by the virtual object. The switching module 1202 is configured to switch, in response to a continuous swipe operation after the long-press operation, a virtual item currently equipped by the virtual object to a target virtual item corresponding to a target item selection control, the target item selection control being an item selection control at a swipe end point indicated by the swipe operation.

In an example, the display module 1201 is further configured to obtain, in response to the long-press operation on the item switching control, an item quantity of the at least one candidate virtual item; and display, in a case that the item quantity is less than a quantity threshold, the item selection control around the item switching control, where the item selection control includes a candidate item identifier, and the candidate item identifier is an item identifier of the at least one candidate virtual item.

In an example, the display module 1201 is further configured to determine a display position of the candidate item identifier based on an item attribute of the candidate virtual item, where the item attribute includes at least one of an item type, an item use frequency, or an item score; and display the item selection control including the candidate item identifier around the item switching control based on the display position.

In an example, the display module 1201 is further configured to determine a selection probability of the candidate virtual item based on the item attribute of the candidate virtual item; and determine the display position of the candidate item identifier based on the selection probability and a preferred position, where the preferred position is determined based on a historical operation record, and a distance between the display position and the preferred position is negatively correlated with the selection probability.

In an example, the display module 1201 is further configured to determine, in a case that there are at least two candidate virtual items corresponding to the same candidate item identifier, an item difference between the at least two candidate virtual items; and display the item selection control around the item switching control, where the item selection control includes the candidate item identifier and a difference identifier, and the difference identifier is configured to indicate the item difference.

In an example, the display module 1201 is further configured to determine, in a case that the item quantity is greater than the quantity threshold, selection probabilities of the candidate virtual items based on item attributes of the candidate virtual items, where the item attribute includes at least one of an item type, an item use frequency, or an item score; screen the candidate virtual items based on the selection probabilities, to obtain selected candidate virtual items, where an item quantity of the selected candidate virtual items is less than the quantity threshold; and display the item selection control including the candidate item identifier around the item switching control based on the selected candidate virtual item.

In an example, the apparatus further includes an obtaining module, configured to obtain, in a case that the item quantity is greater than the quantity threshold, item types of the candidate virtual items. The display module 1201 is further configured to display, based on type identifiers corresponding to the item types, a type selection control including the type identifiers around the item switching control. The display module 1201 is further configured to display, in response to the continuous swipe operation after the long-press operation, and a stay duration of the swipe operation on a target type selection control reaching a first duration threshold, the item selection control corresponding to the candidate virtual item of a target item type, where the target item type is an item type corresponding to the target type selection control.

In an example, the display module 1201 is further configured to display a trigger progress bar in response to the long-press operation on the item switching control, where the trigger progress bar is used for indicating a long-press duration; and display, in a case that the long-press duration reaches a second duration threshold, the item selection control corresponding to at least one candidate virtual item around the item switching control.

In an example, the display module 1201 is further configured to determine an initial item identifier of the virtual item currently equipped by the virtual object; and display the item switching control including the initial item identifier.

The display module 1201 is further configured to display a target item identifier in the item switching control, where the target item identifier is an item identifier corresponding to the target virtual item.

In an example, the display module 1201 is further configured to display, in response to the continuous swipe operation after the long-press operation, and a stay duration of the swipe operation on the item selection control reaching a third duration threshold, item information of the candidate virtual item corresponding to the item selection control.

In an example, the apparatus further includes a cancel module, configured to cancel, in a case that the swipe operation ends and the swipe end point is located in an area outside the item selection control, the switching of the virtual item currently equipped by the virtual object.

In an example, an arrangement of the item selection control includes at least one of the following: a circular arrangement, a triangular arrangement, a rectangular arrangement, a tile arrangement, or a welt arrangement.

Accordingly, in embodiments of this disclosure, when a user switches a virtual item currently equipped by a virtual object, an item selection control for displaying a candidate virtual item can be triggered by a long-press operation on the item switching control. In this case, after swiping to a target item selection control through a swipe operation, the virtual item can be switched to a target virtual item corresponding to the target item selection control. That is, switching of the virtual item can be realized through continuous long-press operation and swipe operation, without a need for a plurality of clicks in an interface, simplifying the operation of switching the virtual item, and improving the virtual item switching efficiency.

Figure 13:
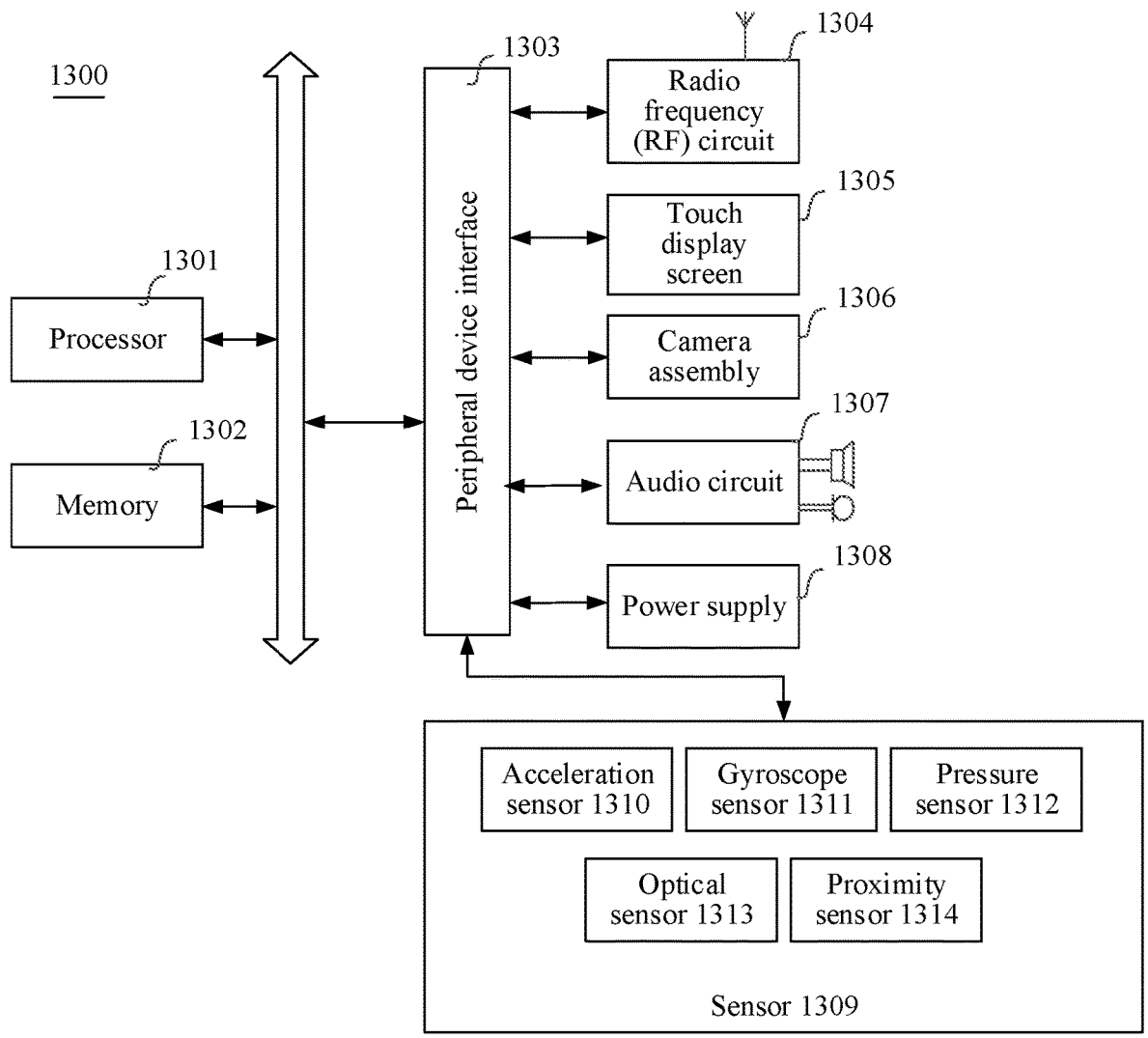
FIG. 13 is a structural block diagram of a terminal according to an exemplary embodiment of this disclosure.

FIG. 13 is a structural block diagram of a terminal 1300 according to an exemplary embodiment of this disclosure. The terminal 1300 may be a portable mobile terminal, such as: a smartphone, a tablet computer, a moving picture experts group audio layer III (MP3) player, and a moving picture experts group audio layer IV (MP4) player. The terminal 1300 may be further referred to as other names such as user equipment and a portable terminal.

Generally, the terminal 1300 includes a processor 1301 and a memory 1302.

Processing circuitry, such as the processor 1301, may include one or more processing cores, such as a 4-core processor or an 8-core processor. The processor 1301 may be implemented by using at least one hardware form of a digital signal processor (DSP), a field-programmable gate array (FPGA), and a programmable logic array (PLA). The processor 1301 may further include a main processor and a coprocessor. The main processor is configured to process data in an active state, also referred to as a central processing unit (CPU). The coprocessor is a low-power consumption processor configured to process data in a standby state. In some embodiments, the processor 1301 may be integrated with a Graphics Processing Unit (GPU), which is responsible for rendering and drawing a content required to be displayed by a display screen. In some embodiments, the processor 1301 may further include an Artificial Intelligence (AI) processor, which is configured to process a machine learning related computing operation.

The memory 1302 may include one or more computer-readable storage media. The computer-readable storage medium may be tangible and non-transient. The memory 1302 may further include a high-speed random access memory (RAM), and a non-volatile memory such as one or more magnetic disk storage devices and a flash storage device. In some embodiments, the non-transitory computer-readable storage medium in the memory 1302 is configured to store at least one instruction, and the at least one instruction being configured to be executed by the processor 1301 to implement the method provided in the embodiments of this disclosure.

In some embodiments, the terminal 1300 may include: a peripheral device interface 1303 and at least one peripheral device. Specifically, the peripheral device includes: at least one of a radio frequency circuit 1304, a touch display screen 1305, a camera 1306, an audio circuit 1307, and a power supply 1308.

In some embodiments, the terminal 1300 further includes one or more sensors 1309. The one or more sensors 1309 include but are not limited to: an acceleration sensor 1310, a gyro sensor 1311, a pressure sensor 1312, an optical sensor 1313, and a proximity sensor 1314.

A person skilled in the art should understand that the structure shown in FIG. 13 constitutes no limitation on the terminal 1300, and the terminal may include more or fewer components than those shown in the figure, or some components may be combined, or a different component configuration may be used.

An embodiment of this disclosure further provides a computer-readable storage medium, storing at least one instruction, the at least one instruction being loaded and executed by a processor to implement the method for switching a virtual item described in the foregoing embodiments.

According to an aspect of this disclosure, a computer program product is provided, the computer program product including computer instructions, the computer instructions being stored in a computer-readable storage medium. A processor of a terminal reads the computer instructions from the computer-readable storage medium, and executes the computer instructions, to cause the terminal to implement the method for switching a virtual item provided in the exemplary implementations of the foregoing aspect.

A person skilled in the art should be aware that in the one or more examples, the functions described in the embodiments of this disclosure may be implemented by using hardware, software, firmware, or any combination thereof. When implemented by using software, the functions can be stored in a computer-readable storage medium or can be used as one or more instructions or code in a computer-readable storage medium for transmission. The computer-readable storage medium includes a computer storage medium and a communication medium, where the communication medium includes any medium that enables a computer program to be transmitted from one place to another. The storage medium may be any available medium accessible to a general-purpose or dedicated computer.

The foregoing descriptions are merely exemplary embodiments of this disclosure, and are not intended to limit this disclosure. Any modification, equivalent replacement, or improvement made within the spirit and principle of this disclosure shall fall within the scope of this disclosure.

What is claimed is:

1. A method for selecting a virtual item, the method comprising:
    displaying an item selection element;
    displaying an item selection control interface based on a continuous touch operation that is initially performed on the item selection element, the item selection control interface including at least one candidate virtual item; and
    determining the selected virtual item as one of the at least one candidate virtual item included the item selection control interface when an end point of the continuous touch operation corresponds to the one of the at least one candidate virtual item in the item selection control interface, wherein
    the item selection control interface includes type identifiers corresponding to different item types of a plurality of virtual items based on the at least one candidate virtual item including a plurality of candidate virtual items, and the plurality of virtual items of a target item type of the different item types is displayed in the item selection control interface when a stay duration of the continuous touch operation on the type identifier of the target item type reaches a first duration threshold.

2. The method according to claim 1, further comprising:
switching an initial virtual item currently equipped by a virtual object to the selected virtual item.

3. The method according to claim 2, wherein
the item selection element includes an initial item identifier of the initial virtual item; and
after the switching the initial virtual item to the selected virtual item, the method further comprises:
displaying an item identifier corresponding to the selected virtual item in the item selection element.

4. The method according to claim 1, wherein the displaying the item selection control interface comprises:
determining an item quantity of the at least one candidate virtual item; and
displaying the item selection control interface with the item selection element when the item quantity is less than a quantity threshold, the item selection control interface including a candidate item identifier for each of the at least one candidate virtual item.

5. The method according to claim 4, wherein the displaying the item selection control interface comprises:
determining a display position of the candidate item identifier of the respective candidate virtual item within the item selection control interface based on an item attribute of the respective candidate virtual item; and
displaying the candidate item identifier within the item selection control interface based on the display position.

6. The method according to claim 5, wherein the determining the display position of the candidate item identifier of the respective candidate virtual item comprises:
determining a selection probability of the respective candidate virtual item based on the item attribute of the respective candidate virtual item; and
determining the display position of the respective candidate item identifier within the item selection control interface based on the selection probability and a frequently used position, the frequently used position being determined based on historical usage information, and a distance between the display position and the frequently used position being negatively correlated with the selection probability.

7. The method according to claim 4, wherein when the item selection control interface includes at least two different candidate virtual items corresponding to a same candidate item identifier, the item selection control interface further includes a difference identifier for each of the at least two different candidate virtual items.

8. The method according to claim 4, wherein
the at least one candidate virtual item includes the plurality of candidate virtual items,
the displaying the item selection control interface comprises:
determining selection probabilities of the plurality of candidate virtual items based on item attributes of the plurality of candidate virtual items when the item quantity is greater than or equal to the quantity threshold; and selecting a subset of the plurality of candidate virtual items based on the selection probabilities, and
the item selection control interface includes the candidate item identifier for each of the selected subset of the plurality of candidate virtual items.

9. The method according to claim 4, wherein
the at least one candidate virtual item includes the plurality of candidate virtual items, and
when the item quantity is greater than or equal to the quantity threshold,
the item selection control interface includes the type identifiers corresponding to different item types of the plurality of virtual items; and
the plurality of virtual items of the target item type of the different item types is displayed in the item selection control interface when the stay duration of the continuous touch operation on the type identifier of the target item type reaches the first duration threshold.

10. The method according to claim 1, wherein the displaying the item selection control interface comprises:
displaying a progress bar that indicates a stay duration of the continuous touch operation on the item selection element; and
displaying the item selection control interface when the stay duration of the continuous touch operation on the item selection element reaches a second duration threshold.

11. The method according to claim 1, wherein after the displaying the item selection control interface, the method further comprises:
displaying item information of one of the at least one candidate virtual item when a stay duration of the continuous touch operation on the one of the candidate virtual item reaches a third duration threshold.

12. The method according to claim 1, wherein after the displaying the item selection control interface, the method further comprises:
canceling the determination of the selected virtual item when the end point of the continuous touch operation does not correspond to any of the at least one candidate virtual item in the item selection control interface.

13. The method according to claim 1, wherein the item selection control interface is configured to display the at least one candidate virtual item in one of a circular arrangement, a triangular arrangement, a square arrangement, a tile arrangement, and a welt arrangement.

14. An apparatus for selection a virtual item, the apparatus comprising:
processing circuitry configured to:
display an item selection element;
display an item selection control interface based on a continuous touch operation that is initially performed on the item selection element, the item selection control interface including at least one candidate virtual item; and
determine the selected virtual item as one of the at least one candidate virtual item included the item selection control interface when an end point of the continuous touch operation corresponds to the one of the at least one candidate virtual item in the item selection control interface, wherein
the item selection control interface includes type identifiers corresponding to different item types of a plurality of virtual items based on the at least one candidate virtual item including a plurality of candidate virtual items, and the plurality of virtual items of a target item type of the different item types is displayed in the item selection control interface when a stay duration of the continuous touch operation on the type identifier of the target item type reaches a first duration threshold.

15. The apparatus according to claim 14, wherein the processing circuitry is configured to:
switch an initial virtual item currently equipped by a virtual object to the selected virtual item.

16. The apparatus according to claim 14, wherein the processing circuitry is configured to:
determine an item quantity of the at least one candidate virtual item; and
display the item selection control interface with the item selection element when the item quantity is less than a quantity threshold, the item selection control interface including a candidate item identifier for each of the at least one candidate virtual item.

17. The apparatus according to claim 16, wherein the processing circuitry is configured to:
determine a display position of the candidate item identifier of the respective candidate virtual item within the item selection control interface based on an item attribute of the respective candidate virtual item; and
display the candidate item identifier within the item selection control interface based on the display position.

18. The apparatus according to claim 17, wherein the processing circuitry is configured to:
determine a selection probability of the respective candidate virtual item based on the item attribute of the respective candidate virtual item; and
determine the display position of the respective candidate item identifier within the item selection control interface based on the selection probability and a frequently used position, the frequently used position being determined based on historical usage information, and a distance between the display position and the frequently used position being negatively correlated with the selection probability.

19. The apparatus according to claim 16, wherein when the item selection control interface includes at least two different candidate virtual items corresponding to a same candidate item identifier, the item selection control interface further includes a difference identifier for each of the at least two different candidate virtual items.

20. A non-transitory computer-readable storage medium, storing instructions which when executed by a processor cause the processor to perform:
displaying an item selection element;
displaying an item selection control interface based on a continuous touch operation that is initially performed on the item selection element, the item selection control interface including at least one candidate virtual item; and
determining a selected virtual item as one of the at least one candidate virtual item included the item selection control interface when an end point of the continuous touch operation corresponds to the one of the at least one candidate virtual item in the item selection control interface, wherein
the item selection control interface includes type identifiers corresponding to different item types of a plurality of virtual items based on the at least one candidate virtual item including a plurality of candidate virtual items, and
the plurality of virtual items of a target item type of the different item types is displayed in the item selection control interface when a stay duration of the continuous touch operation on the type identifier of the target item type reaches a first duration threshold.

* * * * *